United States Patent [19]

Schultenkämper

[11] 4,179,905
[45] Dec. 25, 1979

[54] BEARING SYSTEM IN A UNIVERSAL JOINT

[75] Inventor: Josef Schultenkämper, Essen, Fed. Rep. of Germany

[73] Assignee: Gelenkwellenbau GmbH, Essen, Fed. Rep. of Germany

[21] Appl. No.: 879,613

[22] Filed: Feb. 21, 1978

[30] Foreign Application Priority Data

Apr. 7, 1977 [DE] Fed. Rep. of Germany ....... 2715638

[51] Int. Cl.² ............................ F16D 3/26; F16D 3/33
[52] U.S. Cl. ..................................................... 64/17 A
[58] Field of Search ............................. 64/17 A, 17 R

[56] References Cited

U.S. PATENT DOCUMENTS

| 1,993,357 | 3/1935 | Braun | 64/17 A |
|---|---|---|---|
| 2,018,768 | 10/1935 | Swenson | 64/17 A |
| 2,228,715 | 1/1941 | Wollner | 64/17 A |
| 2,469,713 | 5/1949 | Coleman | 64/17 A |
| 2,698,527 | 1/1955 | Anderson | 64/17 A |
| 2,996,901 | 8/1961 | Kleinschmidt | 64/17 A |
| 3,204,428 | 9/1965 | Stokely | 64/17 A |
| 3,798,926 | 3/1974 | Weible | 64/17 A |

FOREIGN PATENT DOCUMENTS

| 2225594 | 5/1972 | Fed. Rep. of Germany | 64/17 A |
|---|---|---|---|
| 343912 | 10/1936 | Italy | 64/17 A |
| 639640 | 5/1962 | Italy | 64/17 A |
| 358697 | 1/1962 | Switzerland | 64/17 A |
| 739655 | 11/1955 | United Kingdom | 64/17 A |
| 858436 | 1/1961 | United Kingdom | 64/17 A |

*Primary Examiner*—Charles J. Myhre
*Assistant Examiner*—R. C. Turner
*Attorney, Agent, or Firm*—Toren, McGeady and Stanger

[57] ABSTRACT

A bearing system in a universal joint for journaling each of the bearing pins at a cross trunnion includes a journal for receiving each one of the trunnion pins. At least two of the journals are mounted on a drive shaft flange and have projections which engage grooves in an end face of the flange for preventing radial and lateral displacement of the journals with respect to the flange. Each journal has a seating bore for receiving a pin of the cross trunnion. A bearing bushing, having a bottom wall and side walls, is carried in each seating bore. A roller bearing is positioned between the inside of the side walls of the bushing and the trunnion pin carried therein, and a removable guard ring is carried in an annular groove of each journal engaging the bottom wall of its respective bushing for securing the bushing in the seating bore, thereby permitting removal and replacement of the bushing and allowing the use of guard rings having different thicknesses to adjust for clearances.

2 Claims, 4 Drawing Figures

BEARING SYSTEM IN A UNIVERSAL JOINT

BACKGROUND OF THE INVENTION

The present invention relates generally to universal joints, and more particularly to a bearing system in a universal joint for journaling the bearing pins of a cross trunnion in such a joint.

The present invention is applied in a universal joint of the type having a pair of journals with seating bores having roller bearings for journaling a bearing pin of a cross trunnion which is received in the bore. In this type of universal joint, the journals are mounted on a shaft flange and means, such as projections, are typically provided on the journal to engage radial grooves on frontal end faces of the flange to prevent radial and lateral displacement of the journal.

Bearing systems of the foregoing type, such as shown in German Patent No. 624,185, have the disadvantage that once the cross trunnion is positioned in the universal joint and assembled with the journals for supporting the oppositely extending pairs of bearing pins of the trunnion, it is no longer possible to adjust the axial clearances between an end face of each trunnion pin and the bottom wall of its respective seating bore in the journal. Since the journal in this type of universal joint is prevented from both radial displacement and lateral displacement by the use of the projections from the journal engaging a groove in the flange, the amount of clearance between the end face of the pin and the bottom of the seating bore will be solely a function of the manufacturing tolerances of each of the elements. Accordingly, it is virtually impossible to adjust or in any way affect concentric alignment of the parts. Additionally, the lack of precise clearance settings frequently result in increased friction between the journal surfaces and the end face of the trunnion pin which will inevitably lead to the formation of deep scoring or grooving in either the journal or the pin, or will result in cold-welding together of the parts. Also, large clearances resulting from poor manufacturing tolerances, which cannot thereafter be adjusted, may result in imbalances causing axial forces produced by the effects of centrifugal forces.

It is accordingly the principal object of the present invention to provide a bearing system for use in a universal joint which permits adjustment of the clearances between the parts while still preserving the essential simplicity of the bearing assembly.

Another object of the present invention is to provide a simple and relatively inexpensive means for removal and replacement of worn parts in the joint.

Other objects, features and advantages of the present invention will become more apparent from the detailed description of the invention in connection with the accompanying drawings to be described more fully hereinafter.

SUMMARY OF THE INVENTION

The foregoing objects of the invention are accomplished by providing a bearing system in a universal joint for journaling each of the bearing pins of a cross trunnion, having journals with a seating bore for receiving therein each one of the trunnion pins, and includes a bearing bushing carried in each seating bore. A roller bearing is positioned between the inside of the side walls of the bushing and the bearing surfaces of the trunnion pin carried therein, and a removable guard ring is supported in an annular groove in each journal for engaging the bottom wall of the bushing to secure the bushing in the seating bore.

The advantage of the foregoing arrangement is that the guard ring can be removed for easy replacement of any one of the bearing bushings when they become worn. The bushings may be made of a thin walled material with appropriate surface hardness. When the trunnion is assembled with the journals in the universal joint, the bushings will be engaged in the journals regardless of clearances caused by manufacturing tolerances and can thereafter be axially secured in its seating bore by means of the retaining or guard ring. Such an arrangement permits control of the clearances even after assembly so that the universal joint can be in proper balance even when rotating at high speeds. It is vital for these type of cardan joints to have some clearance between the end face of each trunnion pin and the base or bottom wall of the bushing to prevent grooving and excessive wear.

Another advantage of the present invention is that the journals themselves need never be replaced since none of the surfaces of the journal are in actual contact with the surfaces of the roller bearings which engage the trunnion pins. Repair of the cardan shaft is therefore greatly simplified. Additionally, the journals of the present invention can be quickly and inexpensively disengaged from the shaft flange to permit repair and replacement of worn parts and to economically permit repair of the shaft itself.

Another feature of the present invention is that the bottom wall of the bushing is thicker than the side walls. This permits axially directed forces resulting from centrifugal forces which are generated while the joint is in operation, to be absorbed by the bushing.

Another important feature of the present invention is that the guard rings (retaining rings) of different thicknesses may be used to retain the bushing in its respective seating bore and thereby automatically adjust for different clearances. The annular groove in the journal which accommodates the guard ring accordingly has an axial width sufficiently large to accommodate the thickest guard ring of an available selection.

Having a large selection of guard rings with slightly different thicknesses permits remarkably accurate clearance settings. Using a guard ring having a precise thickness selected from a wide range of thicknesses will make it possible to perfectly balance a rotating shaft and will also make it possible to compensate for poor tolerances and concentric alignment.

BRIEF DESCRIPTION OF THE DRAWINGS

Preferred embodiments of the present invention are more fully described in connection with the drawings annexed hereto, in which.

DESCRIPTION OF THE INVENTION

Figure 1:
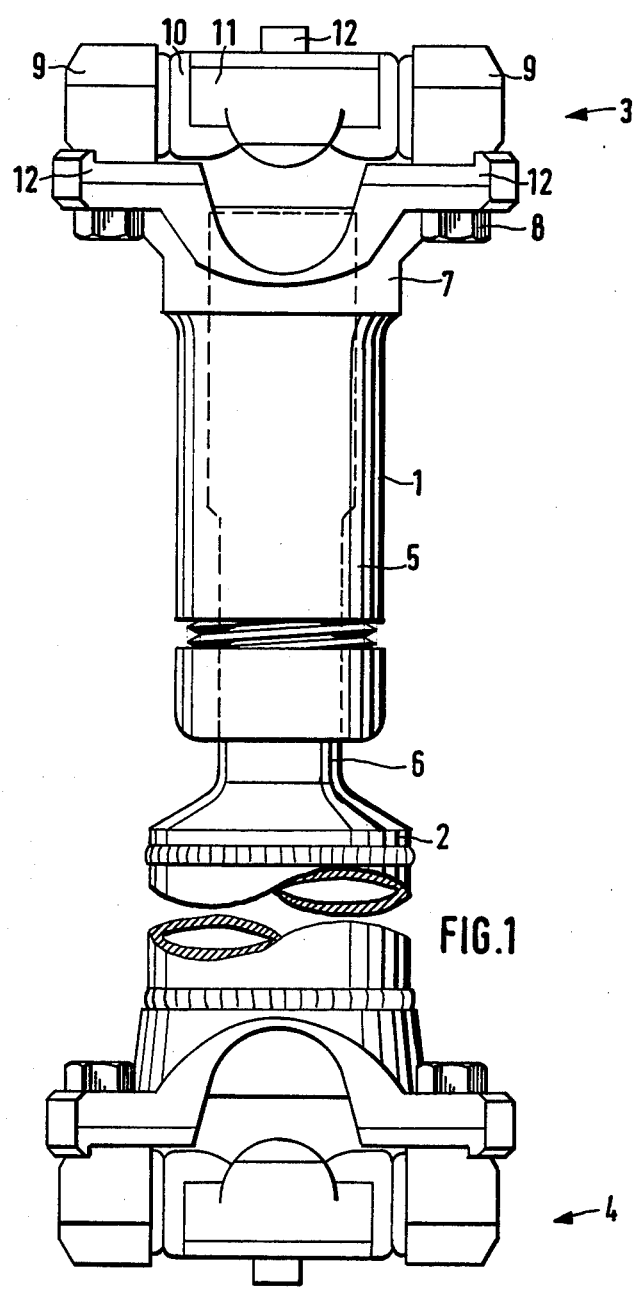
FIG. 1 is an elevational view of a cardan type shaft assembly in which a cross trunnion has pins received in journals which are bolted to a flange of one of the shaft elements.

Referring now in more detail to the accompanying drawings, FIG. 1 illustrates a cardan type shaft having universal joints which incorporate the present invention. The shaft has a first portion 1 and a second portion 2. Universal joints 3 and 4 are carried at opposite ends of shaft portions 1 and 2 respectively. Shaft portion 1 is formed of a hollow section 5 and accommodates a solid section 6 of shaft portion 2. The solid section 6 is slidably engaged with the hollow section 5 and torque may be transmitted between shaft portions 1 and 2 by cooperating V splining. Universal joints 3 and 4 are identical and accordingly the present invention will be described only with reference to joint 3. This universal joint has a yoke 7 which is secured to one end of the shaft portion 1. Journals 9, for journaling one pair of oppositely extending pins of a cross trunnion 10 are bolted to the yoke 7 by means of bolts 8. Two journals 9 are provided on opposite sides of the axis of rotation of the shaft and trunnion, each journal having a seating bore extending in a direction transverse to the axis of rotation for axially receiving therein one of the pins of the cross trunnion 10. Viewing FIG. 1, cross trunnion 10 has one pair of pins lying in the plane of the paper and the other pair of pins extending in a direction transverse to the plane of the paper. Another pair of journals 11 are adapted to be connected, also by bolts, with a flange of a drive or driven shaft (not shown). Each of the journals 11 also has a seating bore for receiving the oppositely extending pins of the trunnion 10 which extend in a direction perpendicular to the plane of the drawing. Each of the journals 9 is provided with projections 12 which cooperatively engage grooves in the yoke 7 to prevent lateral displacement of the journals with respect to the yoke. Similarly, each of the journals 11 are provided with similar projections 12 which are received in a groove formed in the flange of the drive or driven shaft to also present lateral displacement.

Figure 2:
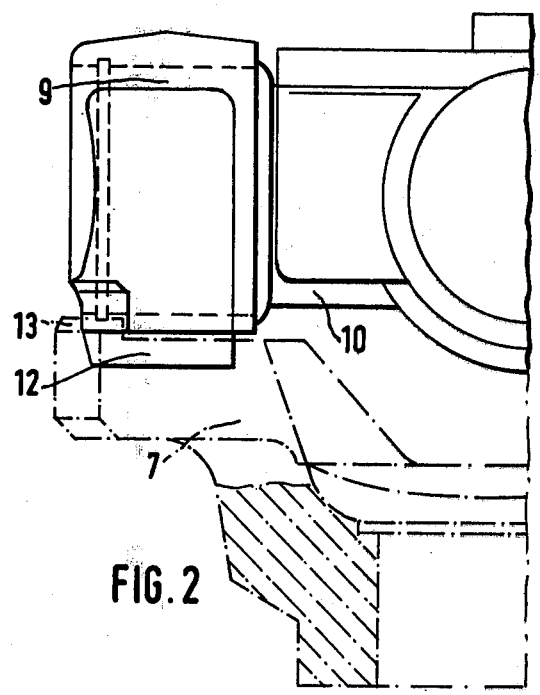
FIG. 2 is an enlarged sectional view through a portion of one of the journals having a trunnion pin journaled therein.

The relationship of one of the bearing pins of the cross trunnion 10 with one of the journals 9 can be more fully appreciated from FIG. 2. It will be seen that the trunnion 10 is coupled with yoke 7 through the journals 9. Since there are two journals 9 connected with yoke 7 for receiving the two oppositely extending axially aligned pins of the trunnion 10, torque will be transmitted from the yoke 7 to the trunnion 10 through both journals 9. Torque can then be transmitted through the other pair of trunnion pins, arranged perpendicular to the pins supported in journals 9, to the journals 11 and then to the flange connected with the driven shaft. It will also be more clearly seen in FIG. 2 that the projection 12 for each journal 9 extends into and is received in a groove of the yoke 7 to prevent lateral displacement of each journal 9. Additionally, a lug 13 is provided for each journal 9 to prevent radial displacement of the journal during high speed rotation of the joint. The lugs 13 also absorb centrifugal forces so that these forces will be transmitted to the bolts 8.

Figure 3:
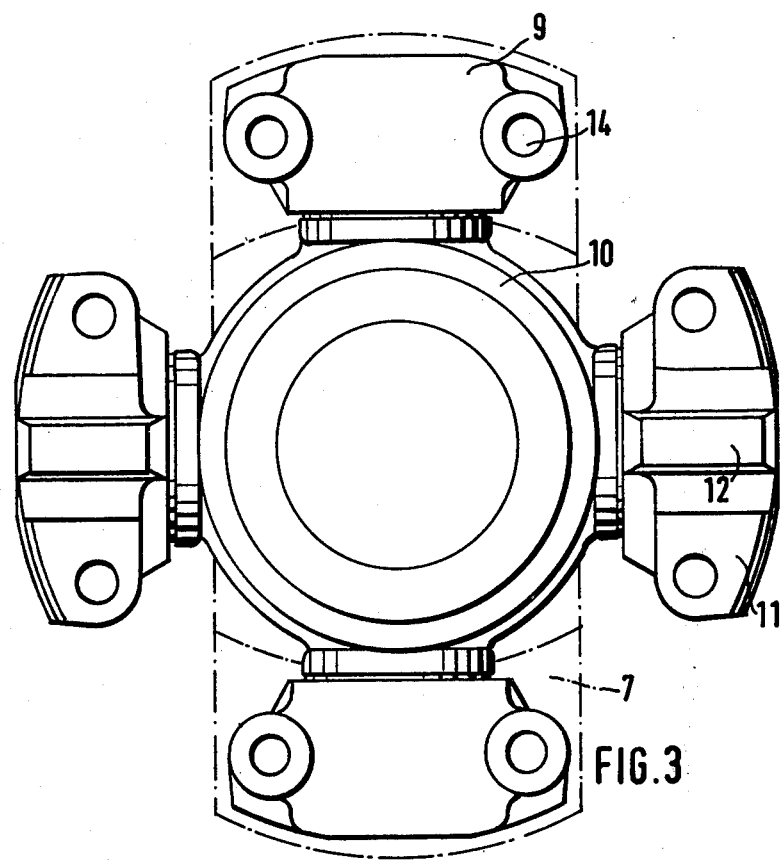
FIG. 3 is a sectional view taken through the journals in a direction transverse to the axis of rotation of the shaft and the trunnion.

Each of the journals 11 are also provided with projections 12, as can be seen in FIG. 3, to be received in a corresponding groove formed in the flange of the driven shaft. Projections 12 thus prevent lateral displacement of the journals 11. In the manner described above, lugs 13 also prevent any radial displacement of the journals 11. As seen in FIG. 3, cross trunnion 10 has one pair of axially aligned bearing pins received in journals 9 and the other pair of axially aligned journal pins, which extend in a direction transverse to the axis of the first pair of pins, received in journals 11. Holes 14 on journals 9 are provided to receive bolts 8 for connection of the journals 9 to the yoke 7.

Figure 4:
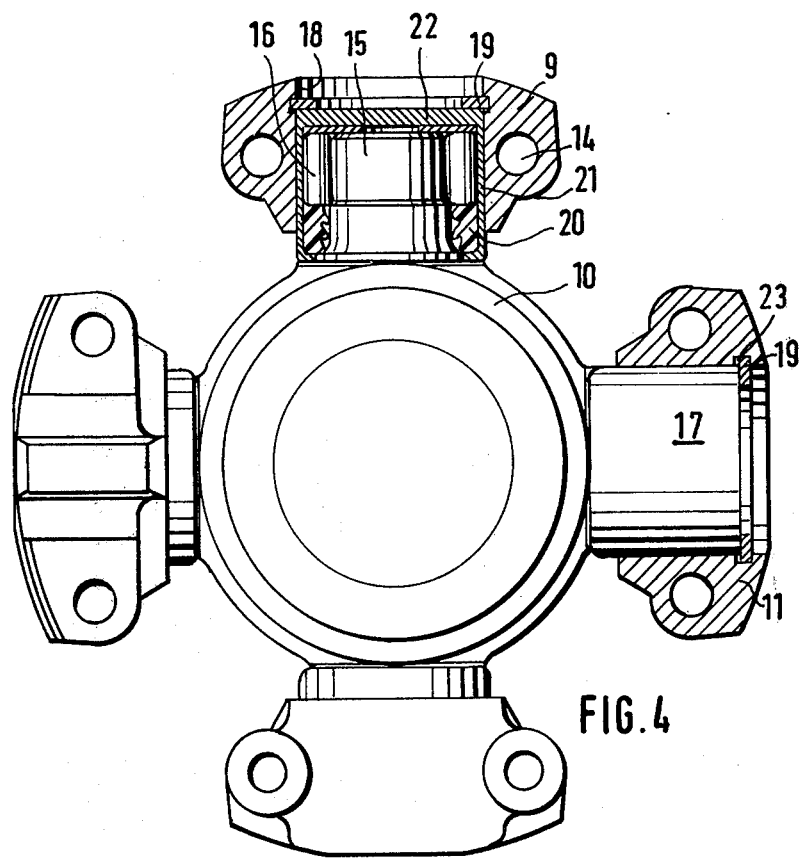
FIG. 4 is a sectional view taken through the journals and the trunnion in the axial direction of the shaft.

Turning now to FIG. 4, it can be seen that each of the journals 9 and each of the journals 11 have a seating bore 18 for receiving therein one of the bearing pins 15 of the cross trunnion 10. A bearing bushing 17 is arranged in the seating bore 18 of each journal. The bearing bushing has a bottom wall 22 and side walls 21 connected with the bottom wall. A bearing pin 15 is received within the bushing 17 of each journal, and a plurality of roller bearings 16 are positioned between the bearing pin 15 and the inside of the side walls 21 of the bushing. Accordingly, roller bearings 16 are engaged between the outside surface of the pin 15 and the inside surface of the side walls 21.

A guard ring 19 retains each of the bushings 17 within its respective seating bore. The guard rings 19 are received and supported in an annular groove 23 of each journal. Guard ring 19 may be selected from a variety of thicknesses to account for any clearances between the bottom wall of the bushing and the end of the seating bore 18 as a result of manufacturing tolerances. Proper selection of the thickness of the guard ring will also serve to axially position the bushing within its respective seating bore for concentric alignment. The groove 23 is of sufficient axial thickness to accommodate guard rings having a wide range of thicknesses. Bottom wall 22 of the bushing 17 is somewhat thicker than the side walls 21 in order to absorb forces generated during rotation of the joint and cross trunnion 10. A sealing ring 20 is also provided to seal the journal 11 and trunnion 10.

It will be appreciated from the foregoing that each of the journals may be easily assembled and properly balanced, with the guard rings provided to adjust for clearances. Additionally, it will be appreciated that none of the journal surfaces are directly subjected to any wear because of the provision of the bushing with roller bearings interposed between the bearing pins of the trunnion and the journal surfaces.

While the present invention has been described and illustrated with respect to a preferred embodiment, it will be appreciated by those skilled in the art, after understanding the purposes of the invention, that various changes and modifications may be made without departing from the spirit and scope of the invention, and it is therefore intended to cover all such changes and modifications in the appended claims.

What is claimed is:

1. A bearing system for a universal joint comprising a cross trunnion bearing pins extending outwardly from said trunnion for journaling a joint member, a journal for each of said trunnion bearing pins, at least two of said journals mounted on said joint member for receiving one pair of axially aligned said bearing pins, projecting means carried on each of said journals for cooperative engagement with said joint member for preventing radial and lateral displacement of said journal with respect to said joint member, wherein the improvement comprises an axially elongated seating bore in each of said journals for receiving therein one of said trunnion bearing pins, said seating bore extending axially through said journal having an open first end and an open second end and with said seating bore having a uniform axial length around the circumference thereof, a thin-walled bearing bushing carried in each said seating bore and extending through said first end and spaced inwardly from said second end, said bushing having a bottom wall extending transversely across said seating bore between the front and second ends of said bore and forming a closure therefor and side walls extending from said bottom wall outwardly from said first end of said bore, roller bearings positioned within said bushing and located between the inside of said side walls of said bushing and said trunnion pin received therein, said roller bearings spaced inwardly from the end of said side walls extending outwardly from said first end of said bore in an annular groove in said seating bore, a removable guard ring seated in said annular groove and in engagement with the bottom wall of said bushing for retaining said bushing in its respective seating bore, said thin walled bearing bushing having said bottom wall thereof thicker than the side walls for absorbing forces generated during rotation of said joint, and a sealing ring located within said bushing and extending around said side walls from the end of said bushing located outwardly from said first end of said bore to said roller bearings.

2. The bearing system according to claim 1 wherein said annular groove for accommodating said guard ring is of an axial width sufficient to accommodate guard rings of varying thicknesses within a predetermined thickness range.

* * * * *